March 15, 1938.  V. GLANZ  2,111,065
STEREOSCOPIC MOVING PICTURE DEVICE
Filed Oct. 12, 1935    2 Sheets-Sheet 1
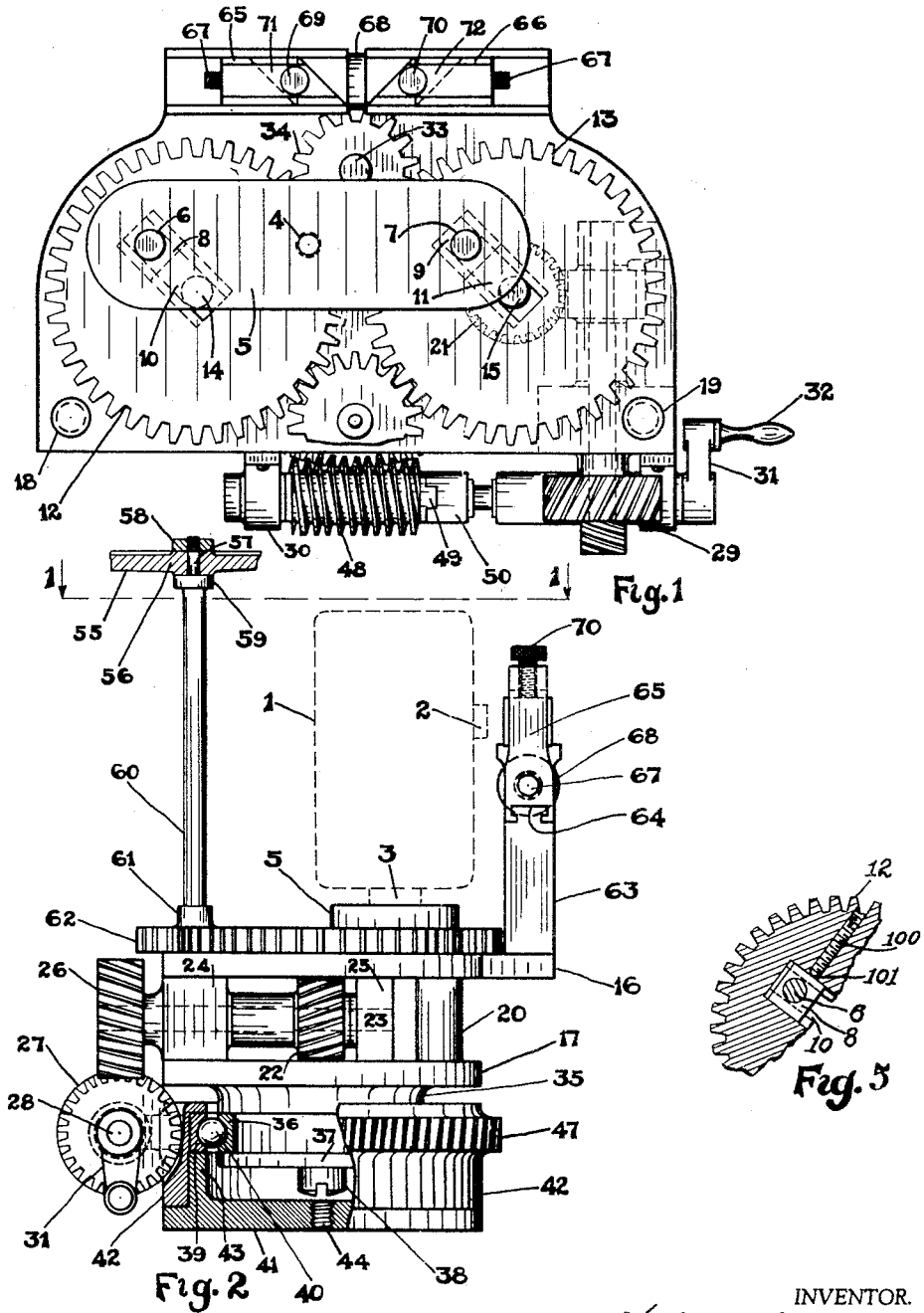
Witness
O. Stangeland
INVENTOR.
Victor Glanz
BY Parkinson & Lane
ATTORNEY.

March 15, 1938.                V. GLANZ                2,111,065
              STEREOSCOPIC MOVING PICTURE DEVICE
                    Filed Oct. 12, 1935        2 Sheets-Sheet 2

Witness
O. Stangeland

INVENTOR.
Victor Glanz
BY Parkinson & Lane,
ATTORNEY.

Patented Mar. 15, 1938

2,111,065

UNITED STATES PATENT OFFICE 2,111,065

STEREOSCOPIC MOVING PICTURE DEVICE

Victor Glanz, Chicago, Ill.

Application October 12, 1935, Serial No. 44,649

2 Claims. (Cl. 88—16.6)

The present invention relates to moving picture cameras and more particularly to a device for taking stereoscopic pictures.

In the usual stereoscopic camera there are provided two lenses or lens sets which are suitably spaced so that a pair of pictures may be taken each from a different point of view so that the combined effect of the pair of pictures is stereoscopic or gives depth to the image with the same perspective as when viewing the object with both eyes. In such a device the incident rays of light from the object being photographed proceed to the lenses or lens sets with the incident rays from the left side through the left lens or lens set and the incident rays from the right side through the right lens or lens set, and it is usual to take the pair of pictures simultaneously or coincidently, the exposures being effected through both lenses or lens sets at the same time or instant. In some cases the rays are passed through two sets of reflecting prisms, whereby a half of the rays is reflected through one set of prisms to the actinic emulsion on the film or plate and the other half is reflected through the other set of prisms to the actinic emulsion on the other film or plate or on another portion of the film or plate.

In some cases a stereoscopic effect is obtained by the use of a lined screen to so break up the image into thin lines that when the image is projected it will present slightly different aspects with the result of a stereoscopic effect. My invention makes use of that principle with a moving lined screen combined together with a movement of the camera and lens from and to left and right hand positions whereby a full stereoscopic effect is produced and whereby the change from one side to the other of the image is effected smoothly and without any perceptible appearance in the change.

Among the objects of the present invention is to provide a novel device so constructed and arranged as to use a moving picture camera of usual construction with but a single lens or single lens set with means for moving the camera from a left to a right position and from a right to a left position, together with means operating in any desired time relation with the positions of the camera and the shutter carried by it and the means for presenting the sights on the moving picture film, whereby the left incident rays from the object will be projected through the lens or lens set when in its left positions of its cyclic movement, while at the same instant the right incident rays from the object will be cut off from or be less effective through the lens, and whereby the right incident rays from the object will be projected through the lens or lens set when in its right positions of its cyclic movement, while at the same instant the left incident rays from the object will be cut off from or be less effective through the lens. This is not a case of dividing a single beam of rays of light from the object but is a case of alternately using different full beams of rays with their full value of light.

The invention may, if desired, and, preferably, comprehend the use of interposed reflecting prisms, the position of the left prism determining the left position limit of the lens and the right prism determining the right position limit of the lens when the camera is moved in its cycle of movement. These prisms may be moved or adjusted toward each other or apart depending upon the desired stereoscopic effect to be obtained, the adjustment determining the stereoscopicity or angle of perspectivity. As for example, if the object being photographed is at such a distance that a good depth effect or perspective ordinarily cannot be had, the prisms are adjusted farther apart and the amplitude of movement of the camera and its lens is accordingly increased, that is, the left position limit of the lens will be more to the left and behind the left prism and the right position limit of the lens will be more to the right and behind the right prism. In that way a better perspective is obtained, with greater depth effect and stereoscopicity.

The invention also comprehends the provision of a novel means designed to coordinate the incidental rays from the object with the operation of the camera mechanism and also with the means for positioning the camera and its lens.

Another object of the invention is to provide a novel means for moving and positioning the camera and its lens.

Other objects, capabilities, advantages, features and the like are comprehended by the invention as will later appear and as are inherently possessed by the invention.

Referring to the drawings:—

Fig. 1 is a top plan view, partly in section, of part of the device and taken in a plane represented by line 1—1 in Fig. 2 of the drawings;

Fig. 2 is a vertical end view of the device with a part shown in broken section;

Fig. 5 is a fragmentary sectional view of a means for adjusting the cyclical movement of the camera.

Figure 4:
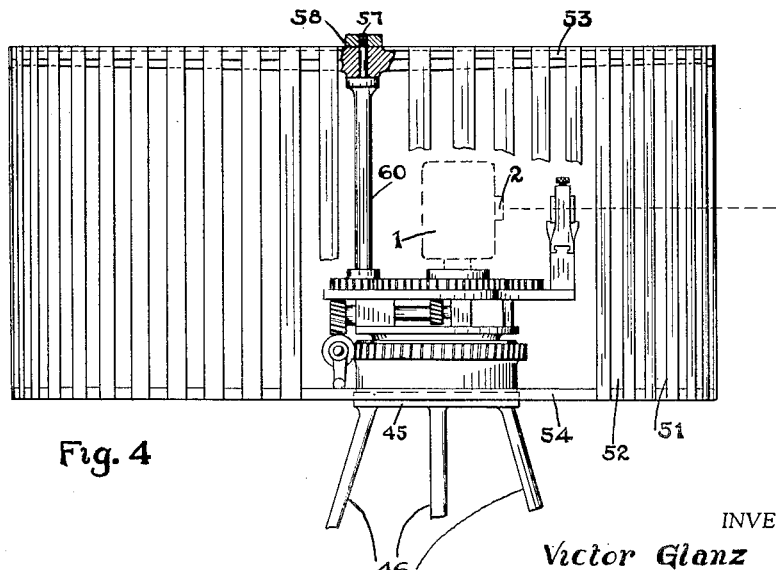
Fig. 4 is a vertical side view of the same with parts broken away.

Referring more in detail to the drawings, the embodiment selected to illustrate my invention is shown in connection with a conventional moving picture machine or camera 1 having a single lens or lens set in a lens holder 2. The camera 1 has a base 3 having a suitable mounting element (not shown) such as a screw for securement in a socket 4 (such as a threaded hole) provided in a cyclical movable plate 5 (Fig. 1). The plate 5 has bearings for receiving trunnions 6 and 7 fixed to blocks 8 and 9 adjustable by set screws 100 in gears 12 and 13, the ends 101 of which are adapted to press against and lock blocks 8 and 9 in the desired position in channels 10 and 11 provided in gears 12 and 13 secured to vertical shafts 14 and 15 finding suitable bearings in the frame bases 16 and 17. The bases are secured together and held rigidly in spaced relation as shown in Figs. 2 and 4 by posts 18, 19 and 20. To the shaft 15 is secured a spiral gear 21 in mesh with a spiral gear 22 fixed on horizontal shaft 23 suitably rotatably supported in bearing blocks 24 and 25 located between and fixed to the bases 16 and 17. To the outer end of the shaft 23 is secured a spiral gear 26 in mesh with a spiral gear 27 fastened to a cross shaft 28 rotatably supported in bearing members 29 and 30 (Fig. 1) secured as by bolts or any suitable securing means to the rear portions of the frame bases 16 and 17 (Fig. 1). To the end of the shaft 28 is secured a crank 31 having a handle 32 by which the mechanism may be manually operated. Carried by the bases 16 and 17 is a shaft 33, Fig. 1) on which is rotatably supported a gear 34 in mesh with both gears 12 and 13 so that motion may be transmitted from one to the other of the latter gears by way of the gear 34.

The base member 17 has a hub 35 which has clamped to it a ball bearing race ring 36 held rigidly in place by a clamping plate 37 and a binding screw 38 secured in the hub 35. An outer ball bearing race ring 39, with which ring and the ring 36 cooperate bearing balls 40, is secured between the upper rim of a base member 41 and the flange part of a ring 42 supported about the rim portion 43 of the base member 41. The base 41 has a threaded socket 44 for securement to the top 45 of a tripod or the like 46. (Fig. 4.) On the periphery of the ring 42 is a ring gear 47, with which meshes a worm or screw 48 rotatably or normally loose on shaft 28. The end of the worm 48 has a clutch tongue 49 adapted to clutch with a clutch jaw 50 splined to the shaft 28 (Fig. 1). By sliding the clutch member 50 along the shaft 28 it may be thrown into or out of clutch with the worm 48 for reacting against the ring gear 47 to direct the camera and its lens in any desired direction. Normally the clutch members 49 and 50 are out of clutch when the device is operated in a given position.

For the purpose of timing the incident rays from the object being photographed, the device has an inceptor comprising a circular series of interceptor elements 51 so spaced as to provide alternate openings 52 for the passage of incident rays. The interceptor elements 51 are secured to rings 53 and 54 of which the ring 53 is secured to the outer ends of spokes or spider 55 having a central hub 56 secured to the shaft 57 by a nut 58 threaded to the threaded upper end of the shaft 57. The hub 56 rests upon the hub 59 of a sleeve 60 secured to the hub 61 rigid with a gear 62 keyed to the shaft 57. The shaft 57 is rotatably supported in bearings provided in frame bases 16 and 17. The gear 62 is in mesh with either or both of the gears 12 and 13 as desired.

At the forward part of the frame 16—17 is provided a post 63 upon which is a track 64 along which are slidably mounted prism holders 65 and 66. The prism holders 65 and 66 may be adjustable by a screw 67 operable by a manually operable wheel 68. After adjustment, the prism holders are set tight by set screws 69 and 70. The holders contain prisms 71 and 72 for the transmission and reflection of light rays incident from the object being photographed.

In operation, the operator first operates the handle 32 to operate the worm 48 which causes the system to rotate or turn by way of the ring gear 47 until the camera is directed in the desired direction. Then the clutch member 50 is declutched. While operating the camera in the usual way, the shaft 28 is rotated by the handle 32 and crank 31 so that gear 27 operates gear 26 and shaft 23, and hence gear 22 operates gear 21 and hence shaft 15 and gear 13. By reason of gear 13 being in engagement with gear 34, the latter acts to operate gear 12 in unison with gear 13. Accordingly, each of the blocks 8 and 9 moves in a circular path to give a cyclic motion to the plate 5 and the camera 1.

Figure 3:
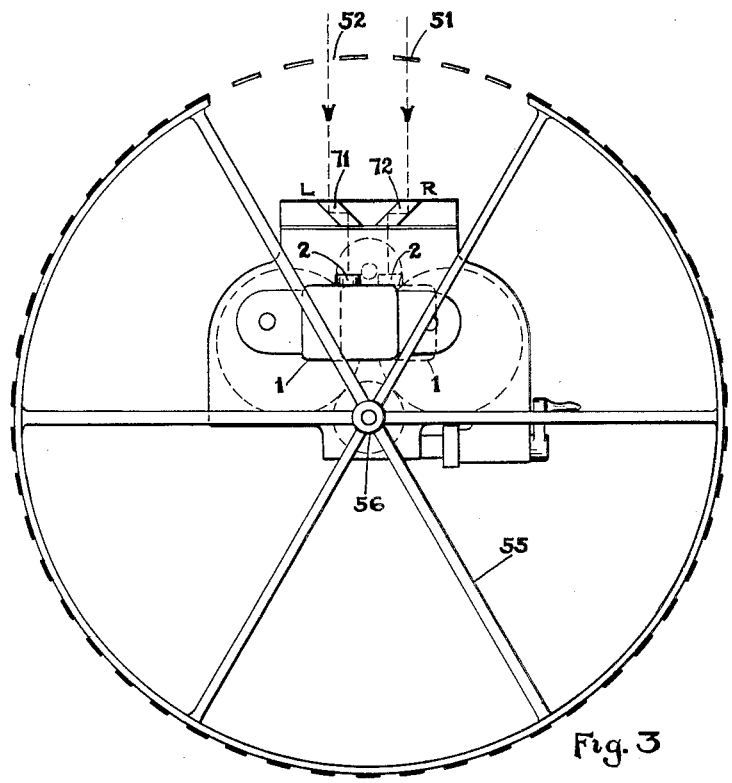
Fig. 3 is a top plan view, partly broken, showing the rotary coordinator for the incident rays, and partly diagrammatic.

For the sake of illustration, it may be assumed that the camera is brought to its left position as shown in full lines in Fig. 3. The lens is opposite the prism 71 and left incident light rays proceeding from the object will pass through the opening 52, via prism 71, and the lens of the camera to be actinically impressed on the sight of the motion picture film at that time opposite the lens. At the same time the right incident rays from the object being photographed have little or no effect on the lens. When the camera 1 is moved to the right as shown in dotted lines in Fig. 3, the lens is opposite the prism 72, and the incident rays from the object pass through prism 72 and the lens of the camera for actinic impression on the film, and at the same time left incident rays have little or no effect on the lens.

At the same time the interceptor is rotated at any desired speed so as to cause the elements 51 to pass by the prisms and successively intercept a portion of the incident rays, the line or area of interception, however, constantly moving across the beam of the incident rays. This has the same effect as the thin line screens mentioned above in producing stereoscopic effect. This is also emphasized by the moving of the camera so that each picture taken, and later projected, is in a slightly different position than the next picture thus again adding to the stereoscopic effect.

Ordinarily, the sights of the moving picture film are so moved as to come up for exposure at any desired or given rate, sixteen per second being usual, the shutter in the lens system operating consonantly therewith. The interceptor is designed to intercept and permit passage of incident rays at the same rate or a lesser rate, but preferably in a multiple time relation, such as thirty-two or forty-eight, etc. times per second. The period of the cyclic movement of the camera is preferably one second although it may be in any other desired period such as one half second, or two seconds, etc. as desired. Hence, assuming the period of cyclical movement of the camera to be one second, it will be seen that for eight sights of the film the lens will be in the range of the, say the right or R prism, that is four sights when moving rightwise and four when moving leftwise from the extreme right position of the lens. During that time, the interceptor has been rotating at such a speed as to expose and intercept incident rays any desired number of times, whether equal to, or greater or less than the exposure on the sight. In other words, assuming the lens to be at the left extreme position and to be moving toward the right, it will first receive an exposure on say, number one sight of the film. When the next opening 52 registers with prism 71, the lens shall have moved rightwise slightly because the movement is a simple harmonic motion, and will still be in position to receive in the main left incident rays from prism 71 and also to receive in smaller degree right incident rays from the prism 72, the interceptor also acting to expose and intercept such rays. In the next position of opening 52, the lens will be but slightly rightwise for the same reason and still receive left and right incident rays from the prisms 71 and 72 similar to what has been previously stated. This will occur for four sights of the film, and the given number of registrations of the interceptor opening 52 so that the effect is a smooth transition of the picture from left to right and with the same corresponding effect when cast on the screen so that the persistence of vision is such as to obtain even in one eye only the stereoscopic effect desired. Because the movement of the camera is a single harmonic motion, the lens moves by the intermediate or middle portion of the prism system 71—72 very rapidly. The lens then begins mainly to receive the right incident rays in its right position as it moves slowly at the end of the simple harmonic motion in the manner similar to what has been stated above.

When it is desired to vary the distance between the prisms as explained above, the blocks 8 and 9 may also be radially varied in the channels 10 and 11 to make the amplitude of the cyclical movement accord with the range of the prisms. The path of the cyclical movement of the camera lens may be in the form of a circle, or the like, the change in the normal (perpendicular) distance from the prism not being sufficient to affect the focus of the image on the film.

The illustrative embodiment is shown with the lens and camera movable while the prism system is held stationary but my invention also comprehends the idea of the prism system being movable and the camera and lens held stationary, it being a part of my invention to effect relative movement of the prism system and the camera and lens regardless of which is movable and which is stationary.

The stereoscopic effect is obtainable without the use of the interceptor but the use of the latter is desirable and useful in increasing or improving the stereoscopicity.

While I have herein described and on the drawings shown an illustrative embodiment of the invention, it is to be understood that my invention is not limited thereto but comprehends other constructions, details, arrangements of parts, features, and the like, without departing from the spirit of the invention.

Having thus disclosed the invention, I claim:

1. A stereoscopic moving picture camera having a single lens in front of a moving film, a plurality of stationary reflectors spaced apart along a line prependicular to the axis of the lens for reflecting images from spaced points into the lens, means for moving the camera in a cyclical path in the line of said reflected rays, and means having alternate light intercepting openings movable in timed relation with the exposures of the film to produce a multiplicity of line images on each exposure of the film.

2. A stereoscopic moving picture camera having a single lens in front of a moving film, a plurality of reflectors spaced apart along a line perpendicular to the axis of the lens for reflecting images from spaced points into the lens, means for moving the camera in a cyclical path in the line of said reflected rays, means having alternate light intercepting openings movable in timed relation with the exposures of the film to produce a multiplicity of line images on each exposure of the film, said last means comprising a circular series of spaced light intercepting elements outside the camera.

VICTOR GLANZ.